Nov. 18, 1958
R. F. FINN ET AL
2,860,815
METHOD OF AND APPARATUS FOR REDUCING WATER
ABSORPTION BY LIQUID FUELS
Filed Dec. 22, 1953
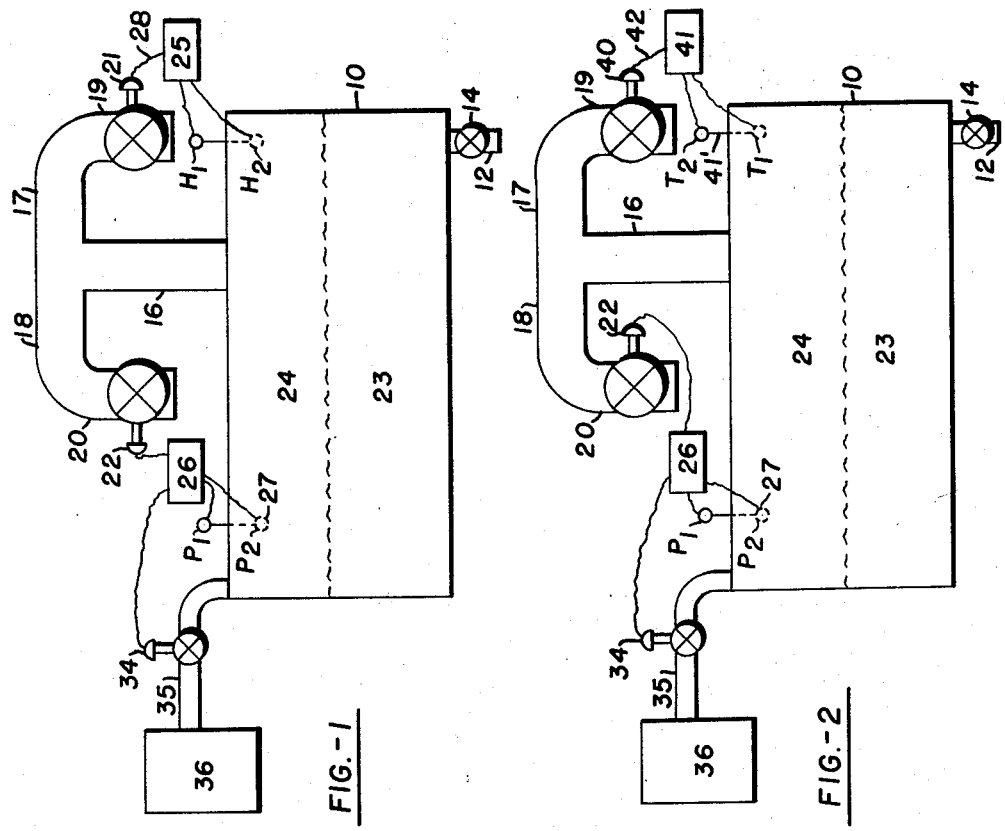
Richard F. Finn
John J. Kolfenbach
William E. Lifson
Inventors
By George J. Silhay Attorney

United States Patent Office 2,860,815
Patented Nov. 18, 1958

2,860,815

METHOD OF AND APPARATUS FOR REDUCING WATER ABSORPTION BY LIQUID FUELS

Richard F. Finn, Iselin, John J. Kolfenbach, North Plainfield, and William E. Lifson, Union, N. J., assignors to Esso Research and Engineering Company, a corporation of Delaware Application December 22, 1953, Serial No. 399,682

4 Claims. (Cl. 220—85)

This invention relates to a method of and apparatus for maintaining hydrocarbon liquid fuels substantially free of water in tanks.

Water dissolved or absorbed in hydrocarbon liquid fuels is undesirable in tanks on aircraft, storage tanks generally, such as stationary tanks, loading tanks for aircraft and the like.

Water in fuels used in aircraft operation is undesirable because at low temperatures this water will form ice which will deposit on fuel filters and control mechanisms and adversely affect fuel flow and engine performance. The use of micronic filters in fuel lines does not solve the problems, because, unless an inordinately large filter is used the filter will plug. Large and heavy filters can not be tolerated for aircraft use. Instances of filter icing in jet plane operation have occurred and in some cases de-icing equipment has been installed on the planes but this is not entirely satisfactory because it imposes an undesirable weight penalty, reduces the amount of fuel an aircraft can carry and adds equipment to an already complicated system.

Most aircraft tanks and storage tanks for fuels are equipped with vents. Consequently, fuels are usually in contact with the atmosphere from the time of manufacture to end use in combustion. Contact with the atmosphere has a marked effect on the water content of fuels. It has been found that whenever a fuel is stored in a vented tank, the water content of the fuel will tend to come to equilibrium with that of the atmosphere contacting it and will come to equilibrium if sufficient time is allowed. Thus water is lost from a water saturated fuel exposed to dry air and water is gained by a dry fuel contacting humid air. In one set of experiments equilibrium was essentially reached in about 4 hours when a dry hydrocarbon liquid fuel was exposed to humid air, or when a water saturated fuel was exposed to relatively dry air of 33% relative humidity. However, about 90% of the equilibrium was reached in about 3 hours.

Water is rapidly lost from water-saturated liquid fuels to air of low absolute humidity by a process of diffusion of water through the fuel to the vapor space above the liquid fuel in the tank and then by vapor diffusion through the tank vent into the air. Thus there is diffusion of water from an area of relatively high water concentration to an area of lower water concentration. The reverse process is true for water absorption by the dry fuel from a humid atmosphere. The absolute humidities of the air and of the fuel have a marked effect on this phenomenon.

Temperature also has a marked effect on the transfer of water to and from liquid fuels. It is now known that water is lost from warm water saturated liquid fuels by venting to a cold air atmosphere. When an aircraft is re-fueled from an underground storage tank in cold weather, or re-fueled and then climbs to altitude, the ambient air contacting it will be considerably lower in temperature than the fuel. This cold air has a relatively low water content even at 100% relative humidity and consequently has a low partial pressure of water vapor (low absolute humidity). As a result, water will pass from the liquid fuel to the cold air until the water content of the fuel attains an equilibrium with that of the atmosphere. In other words, cold air will act just like air of low relative humidity in dehydrating fuel. The amount of water lost from a water saturated liquid fuel to cold air can be very great because of the low water content (partial pressure) of the cold air. For example, a warm fuel vented to $-10°$ F. saturated air, loses water until the water content of the fuel is equivalent to the water content of a fuel saturated at $-10°$ F.

This is shown in Table 1 which compares water contents of fuels exposed to air at three different temperatures.

TABLE 1

Water contents of JP–4 jet fuel initially saturated at 75° F. and exposed to cold air at 100% relative humidity

| Air Temperature | Vol. Percent Water | |
|---|---|---|
| | Initial | Final Equilibrium Observed |
| $-10°$ F | .0085 | .0020 |
| $+20°$ F | .0085 | .0035 |
| $+40°$ F | .0085 | .0048 |

If the cold air is at less than 100% relative humidity, the final water content of the fuel will be even lower.

On subsequent descent to lower altitudes the fuel is now cold, and warmer and more moist air is encountered and the water content of the fuel will be increased as a result of water transfer from the air to the fuel with the tank vent open.

Fuel agitation is an important factor affecting the rate of water transfer between liquid fuels and the atmosphere. This agitation may result from thermal mixing due to temperature changes within the fuel caused by evaporation or conductance with colder air or it may be in the form of mechanical mixing as caused by booster pump operation and by flight vibrations. Under normal storage conditions there is sufficient thermal and mechanical mixing to make water transfer fairly rapid. Under flight conditions excellent agitation is obtained and water transfer will be extremely rapid.

The present invention is applicable to storage tanks in refineries, tanks for loading vehicles at airports or other places, to home heating oil tanks, to aircraft tanks, to transporting tank trucks and to liquid fuel storage tanks generally. The icing aspects of water in aircraft tanks has been above discussed. Water in storage tanks causes corrosion and if water is prevented from entering the tanks such corrosion can be prevented. The same is true of home heating oil tanks where water accumulates because the tank is generally cooler in the summer months than the air to which the tank is vented. As a result, the tank condenses water out of the air and deposits the water in the bottom of the tank. The provision for breathing through the tank vent in home heating oil tanks is primarily to replace the volume of fuel withdrawn with an equal amount of air to maintain atmospheric pressure and in such case the breathing is restricted to only the volume of air needed to replace the fuel withdrawn. An absorbent material may be used with this arrangement to dry the air going to the tank. However, breathing has a broader meaning in that it means mass movement of air into and out of a tank and this will apply to other tanks.

In large storage tanks the temperature differences to which the tanks are subjected are greater than in home heating oil tanks and therefore there will be more breathing of the tanks.

In aircraft tanks the temperature differences and therefore the amount of breathing are still greater and icing due to accumulated water is aggravated. By using the present invention many of the problems caused by icing will be eliminated.

According to one form of the present invention provision is made to eliminate accumulation of water in hydrocarbon liquid storage tanks or aircraft tanks by utilizing a venting device that works on a humidity differential and/or pressure differential basis. Absorption of water from the atmosphere by hydrocarbon liquid is prevented by closing the tank vent when the humidity of the atmosphere is higher than the humidity in the tank. Elimination of water from a water-containing hydrocarbon liquid is accomplished by opening the tank vent when the humidity of the atmosphere is lower than the humidity in the tank.

In another form of the invention absorption of water by hydrocarbon oil is substantially prevented by opening the tank vent when the hydrocarbon liquid temperature is higher than the outside atmosphere. When the hydrocarbon liquid temperature is lower than the outside temperature the vent is closed.

As to the pressure differential between the interior and exterior of the tank, a valve is used for closing the tank vent on increase of the external pressure and for opening the tank vent on decrease of the external pressure or constant external pressure. The pressure differential basis is especially useful for use with aircraft tanks in flight. Provision is also made for supplying dry gas to the vapor space above the liquid in the tank when the vent valve is closed. Control mechanisms are preferably used to operate the vent valve when temperature and/or pressure and/or humidity differentials occur. Or the valve may be operated manually.

In the drawings:

Fig. 1 represents a vertical cross-section of one form of the invention utilizing pressure and/or humidity differentials;

Fig. 2 represents a vertical cross-section of another form of the invention utilizing a pressure and/or temperature differentials.

Referring now to the drawings, the reference character 10 designates a tank which is adapted for use as a stationary tank such as a storage tank, loading tank, home heating oil tank, aircraft tank, transporting tank truck and the like. The tank 10 is provided with a bottom outlet line 12 provided with valve 14. Outlet line may be a drain or a drawoff line for withdrawing liquid fuel from the tank 10. The tank is also provided with a vent line 16 in the form of a T leading upwardly from the top of the tank for a distance and provided with horizontally extending arms 17 and 18. Arm 17 has a downwardly directed extension 19 at its extremity. Arm 18 has a similar extension 20. The outlet end of extension 19 has a control valve 21 and the outlet end of extension 20 has a control valve 22 for controlling opening and closing of the vent as will be hereinafter described in greater detail. The tank is shown as containing a liquid 23.

As has been pointed out above hydrocarbon liquid fuels will absorb water from the ambient atmosphere under certain conditions and the present invention substantially eliminates this undesirable feature. The vapor space 24 above liquid 23 in tank 10 communicates with vent 16. To prevent water from entering tank 10 from the atmosphere through vent 16, and to permit escape of water from the hydrocarbon liquid to the air, venting control devices 25 and 26 are provided. The venting control device 25 is connected to control valve 21 by line 28 in a conventional manner. Control valve 21 opens the vent 16 to the atmosphere via outlet line 19 when the absolute humidity in the tank 10 is greater than that of the outside air, and closes vent 16 when the absolute humidity of the atmosphere is greater than that inside the tank.

For example, in a stationary storage tank other than one using water displacement for removing liquid from the tank, water accumulates as a result of breathing of the tank or sucking in warm humid air into the cool tank where water may condense out. One method of preventing such accumulation of water is the utilization of control means 25 for controlling valve 21, the control means being responsive to the absolute humidity differential existing between the exterior and the interior of tank 10 and indicated by $H_1$ and $H_2$ devices. The devices responsive to humidity differentials, diagrammatically shown, are in essence dew-point measuring devices which are commercially available from several instrument companies.

Control means 25 comprising a motor which is actuated by a differential between humidity sensing devices $H_1$ and $H_2$, operates valve 21 by electrical or pneumatic means (diagrammatically shown).

As above described vent line 16 has two outlets 19 and 20. Outlet 19 has been described in connection with control responsive to humidity differentials. Outlet 20 is controlled by valve 22 in response to pressure differentials existing between the interior and exterior of the tank 10. If the pressure in tank 10, indicated by $P_2$ forming part of pressure differential actuated means 27 is greater than or equal to the pressure of the ambient air atmosphere, indicated by $P_1$, then the pressure differential means 27 will actuate control means 26 which in turn will actuate valve 22 to open it to permit venting of vapors from tank 10 through vent 16 and outlet end 20 thereof.

If the pressure inside the tank 10 is less than that of the outside air, valve 22 will be actuated to closed position. With valve 22 closed it is necessary to supply gas to the space 24 above liquid 23 in tank 10. Under these conditions control means 26 will actuate control valve 34 in line 35 leading from a source of dry inert gas such as, for example, auxiliary tank 36 containing dry inert gas. Line 35 communicates with vapor space 24 of tank 10.

In aircraft the source of dry inerting gas may be dry air used for instrument air or any dry purging gas such as nitrogen. Such purging gas should preferably maintain a slight positive pressure inside the tank 10.

When the absolute humidity differential between the atmosphere and the tank vapor space is such that vent control valve 21 is closed but at the same time a pressure differential exceeding safe limits exists between inside and outside (being larger inside) valve 22, controlled by pressure regulator 26, will open to permit flow of vapors to the outside atmosphere and thus equalize the pressure. When the reverse situation occurs and the pressure inside the tank is less than that outside, pressure equalization is obtained by dry gas purging through line 35. The flow of dry gas is regulated by valve 34 controlled by pressure regulator 26. Purging line 35 is connected to a source of dry gas diagrammatically shown at 36. Gases such as nitrogen, combustion gases, compression bleed air or other inert gases may be used. These may be treated with a dehydrating agent such as activated alumina, barium oxide, etc. and passed through line 35 to tank 10, or such gases as previously mentioned may be compressed and cooled to remove water and then used as inert dry gases.

The above operation also applies to aircraft tanks on a flight to permit opening of valve 22 to the atmosphere when the pressure in tank 10 is greater than that of the ambient air atmosphere. On descent of the aircraft the pressure in the tank will be less than that of the outside air. As above explained pressure regulator 26 will actuate valve 34 to allow the flow of dry inert gas from 36 through line 35 into the tank.

In an aircraft the source of dry inert gas may be dry air used for instrument air or any dry purging gases such as nitrogen. Such purging gas should preferably maintain a slight positive pressure inside the liquid containing tank. When the aircraft is on the ground between flights the system would operate as previously described. The dry gas purging system should still function to prevent condensation of water by the cold tank and fuel.

During ascent the internal pressure will become relatively greater than the external pressure and vent valve 22 will be opened to the atmosphere. In other words valve 22 will be closed by pressure regulator 26 during descent (increasing external pressure) and will be opened during climb. During cruise or at any other time when a humidity differential exists valve 21 will be operated by humidity differential regulator 25.

Referring now to Fig. 2 there is shown a modification in which the valves in the vent line are operated to open the vent to the atmosphere when the temperature and/or pressure in tank 10 is greater than that of the outside air. In Fig. 2 provision is made for temperature and pressure differentials inside and outside the tank as distinguished from the apparatus shown in Fig. 1 wherein provision is made for pressure and humidity differentials inside and outside the tank. Like parts in Fig. 2 are designated by the same reference characters used in Fig. 1 and the description of these parts will not be repeated in detail but will be referred to as necessary to complete the description of the apparatus of Fig. 2.

When the temperature in tank 10 is greater than that of the outside air, control valve 40 is opened to permit egress of vapors from the tank. When the temperature in the tank 10 is less than that of the outside air, control valve 40 is closed to prevent entry of outside air into the tank and then inert dry gas is supplied to space 24 above liquid 23 in tank 10 through line 35 because valve 34 opens; or dry inert gas is supplied from some other source. Control means 41 is actuated by a conventional differential thermostat generally indicated at 41' which is actuated at one end by $T_1$, the temperature of the liquid in the tank and at the other end by $T_2$, the temperature of the outside air. Control means 41 is operatively connected to valve 40 by means 42.

When the temperature of the hydrocarbon liquid 23 in the tank 10 is higher than the ambient air atmosphere, thermostat 41' actuates control means 41 which in turn actuates valve 40 to open position wherein vent 16 is in communication with outlet line 19 open to the outside atmosphere.

When the temperature of the liquid in the tank 10 is equal to or lower than the ambient air atmosphere, the thermostat 41' actuates control means 41 which will actuate valve 40 to the closed position. With the valve 40 in closed position outlet line 19 is in communication with vapor space 24 of the tank. Line 35 is connected to a source of dry inert gas diagrammatically shown at 36 and communicates with vapor space 24.

The above operation also applies to aircraft tanks on a flight to permit opening of valve 40 to outlet line 19 to the atmosphere when the temperature of the liquid hydrocarbon in tank 10 is greater than that of the ambient air atmosphere. When the pressure in tank 10 is greater than the ambient air pressure, means 27 will actuate control means 26 which will open valve 22. On descent of the aircraft the temperature of the liquid hydrocarbon in the tank will be less than that of the warmer more humid outside air and also the pressure in the tank will be less than that of the outside air. As above explained control means 41 will actuate valve 40 to closed position with outlet line 19 closed, and with the pressure in tank 10 less than the ambient air pressure, means 27 will actuate control means 26 to close valve 22 and open valve 34 in line 35 which communicates with a source of dry inerting gas. Dry inert gas may be obtained in a number of ways as above described in connection with Fig. 1. The form of invention shown in Fig. 2 also provides for control due to pressure changes as above described in connection with Fig. 1.

When used on aircraft, vent valve 21 and control means 25 may be omitted in which case optimum advantage is not taken of the invention and the system is operated solely on pressure differential by valves 22 and 35 and pressure regulator 26. In this case valve 22 would open during ascent and remain open during cruise closing only when the external pressure exceeds the internal tank pressure. When the latter occurs pressure regulator 26 would open valve 34 and permit dry gas flow to tank 10 through line 35.

What is claimed is:

1. A method for storing volatile liquids containing or tending to absorb water, wherein said liquids are retained in a confined storage zone so as to provide a vapor space above the upper surface of said liquids and wherein absorption of water by said liquids is inhibited and liquids having an initial water content have such content reduced, which method comprises admitting air, from an ambient atmosphere of air exteriorly of said zone, into said vapor space and into contact with the upper surface of said retained liquid only when the pressure in said vapor space is less than the static pressure of said ambient atmosphere and the indicated partial pressure of water vapor in said vapor space is higher than the indicated partial pressure of water vapor in said ambient atmosphere of air, and discharging said air and vapors from said vapor space whenever the positive pressure in said vapor space is higher than the static pressure of said ambient atmosphere exteriorly of said zone.

2. An apparatus for the storage of volatile liquids which contain or absorb water which comprises a closed container for said liquids, said vessel adapted to provide a vapor space above the surface of liquids contained therein, a first conduit means communicating with said vapor space and with ambient atmospheric air exteriorly of said vessel, a first valve in said conduit means actutable to open and close communication between said vapor space and the ambient air through said conduit means, a second valve in said conduit means actuatable to open and close communication between said vapor space and the ambient air through said conduit means, a source of dry gas, a second conduit means communicating with said vapor space and said dry gas source, including a valve in said conduit means actuatable to pass dry gas from said source into said vapor space, means sensitive to pressure differences between said vapor space and the ambient air, including means energized thereby and adapted to actuate said first valve to open communication through said first conduit between said vapor space and the ambient air when the pressure in said vapor space is higher than the static pressure of the ambient air, and to close said communication when said pressures are related otherwise, and also adapted to actuate the valve in said second conduit means in a reverse sequence to that of said first valve, and means responsive to a condition of the respective atmospheres of the vapor space and the ambient air which condition is indicative of the relative partial pressure of water present in said ambient atmosphere and in said vapor space, said responsive means including means energized by such conditions and adapted to actuate said second valve to open communication between said ambient air and said vapor space through said first conduit means when the indicated partial pressure of water in the vapor space is higher than that of the ambient air, and to close said second valve when the indicated partial pressures of water in said vapor space and the ambient atmosphere respectively are related otherwise.

3. An apparatus according to claim 2, wherein said means responsive to the condition of said vapor space and the ambient air comprises a means for differential determination of the absolute humidity of the atmosphere of said vapor space and the absolute humidity of the ambient air, and wherein said means adapted to actuate said second valve is energized to open communication through said first conduit when the absolute humidity of the atmosphere within said vessel vapor space is higher than the absolute humidity of the ambient air, and to close such communication when the absolute humidities of said respective atmospheres are related otherwise.

4. An apparatus according to claim 2, wherein said means responsive to the condition of said vapor space and the ambient air comprises a thermometric means adapted to determine the relative temperatures of said vapor space and the ambient air, and wherein said means adapted to actuate said second valve is energized to open communication through said first conduit when the temperature within said vessel vapor space is higher than the temperature of the ambient air, and to close such communication when the temperatures of said respective atmospheres are related otherwise.

References Cited in the file of this patent

UNITED STATES PATENTS

| | | |
|---|---|---|
| Re. 17,676 | Cone | May 27, 1930 |
| 2,379,215 | Brinkmann | June 26, 1945 |
| 2,583,062 | Riboud | Jan. 22, 1952 |